D. HARVEY.
ORCHARD PLOW.
APPLICATION FILED JUNE 7, 1913.

1,106,213.

Patented Aug. 4, 1914.

Witnesses
Floyd R. Cornwall
W. A. Williams

Inventor
D. Harvey
By
Atty.

THE NORRIS PETERS CO., PHOTO-LITHO., WASHINGTON, D. C.

UNITED STATES PATENT OFFICE.

DANIEL HARVEY, OF BOX HILL, MELBOURNE, VICTORIA, AUSTRALIA, ASSIGNOR TO RALPH EDWIN BOARDMAN, OF ST. KILDA, AND FRANK CAMERON SCHULZE, OF BRUNSWICK, VICTORIA, AUSTRALIA.

ORCHARD-PLOW.

1,106,213.      Specification of Letters Patent.      Patented Aug. 4, 1914.

Application filed June 7, 1913. Serial No. 772,373.

*To all whom it may concern:*

Be it known that I, DANIEL HARVEY, a subject of the King of Great Britain and Ireland, residing at Whitehorse Road, in the post town of Box Hill, a suburb of the city of Melbourne, in the county of Bourke, State of Victoria, Commonwealth of Australia, have invented a certain new and useful Improved Orchard-Plow, of which the following is a specification.

This invention relates to implements used particularly for plowing orchard land.

Hitherto with some types of orchard implements it has not been possible to plow closely beneath the branches of the trees as the horse and plowman can not conveniently pass beneath the same. In consequence strips of land beneath the trees have had to be overturned by hand which has absorbed much time and labor.

The object of this invention is to provide a plow by the use of which much more of the land can be overturned and laborious manual digging be thereby obviated. By the invention the land may be plowed up to the butts of the trees, the horse and plowman passing clear of the branches. A plow according to this invention, may for ordinary work be used as a common implement which follows directly behind the horse but it may be speedily changed to one which plows to either side of the animal and its driver and beneath the branches of the trees. The plow is light of draft, easy to manipulate and simple yet strong in construction.

Figure 1:
Figure 2:
Figure 3:
Figure 4:
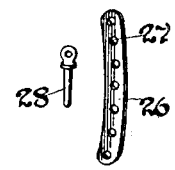
Figure 5:
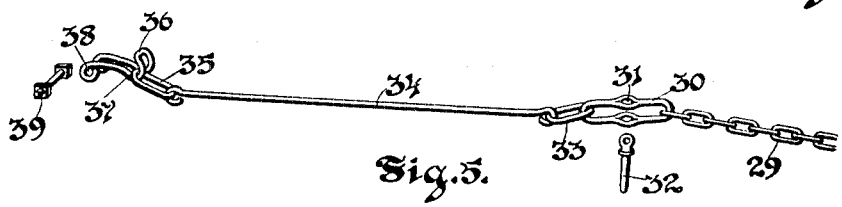
Figure 6:
Figure 6A:
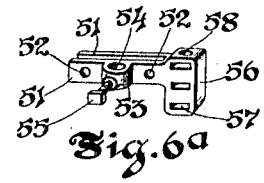
Figure 7:
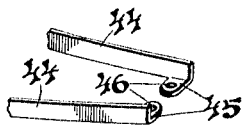
Figure 8:
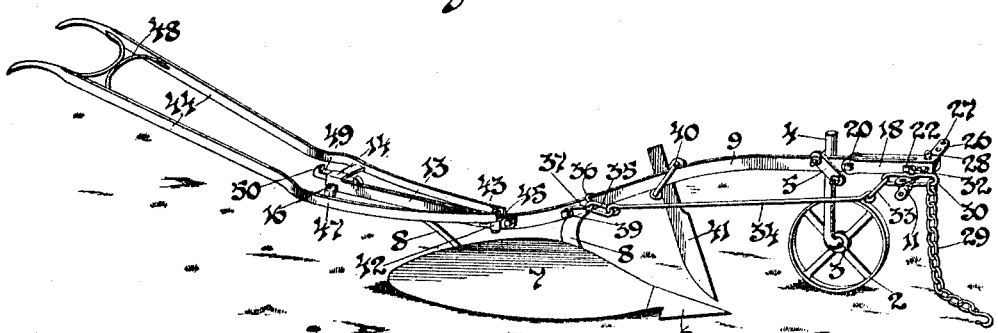

Referring to the drawings which form part of the specification, Figure 1 is a perspective view of a plow beam according to the invention. Fig. 2 is a perspective view of a bracket and pivot pin carried thereby. Fig. 3 is a perspective view of a clevis, a pivot pin and a retention pin. Fig. 4 is a perspective view of a segmental draft bar and retention pin. Fig. 5 is a perspective view of a draft chain and appurtenances. Fig. 6 is a perspective view of a double headed wedge. Fig. 6ª is a view of a modified clevis applicable to the front of the plow beam. Fig. 7 is a perspective view of the lower ends of two handles, separated for convenience of illustration. Fig. 8 is a perspective view on a reduced scale of a plow according to the invention.

The invention includes a supporting wheel 2 mounted upon an axle 3 carried by a stem 4. At the upper end of the stem is a suitable clamp or other retainer 5. Behind the supporting wheel is a plow share 6 of any desired construction. Adjoining the share 6 is a suitable mold board 7 to which are attached the lower ends of standards 8 and braces 8'. Above the supporting wheel 2 and share 6 is a beam 9 having a front end and a rear end. Formed through the front end of the beam 9 is a pivot pin hole 10. Depending from the front end of the beam 9 is a segmental downward extension 11 in which is a series of adjusting holes 12. At the rear end of the beam 9 is an upward extension 13 having at its extremity a bridge 14, depending from which is a fold 15. Formed through the rear end of the beam 9 and through the fold 15, below the bridge 14, is a transverse slotway 16. Beneath the bridge 14 is a wedge passage-way 17.

With the plow beam is used a clevis consisting of two legs 18 each having in its rear end a pivot pin hole 19 accommodating a pivot pin 20. This passes through the hole 10 in the plow beam. Formed in the front end of each of the legs 18 is a locking pin hole 21 accommodating a locking pin 22. This passes through one of the holes 12 in the segmental extension 11. At the front end of the legs 18 is a bridge 23 having therein a locking pin hole 24. Beneath the bridge 23 is a transverse slotway 25.

Passing through the transverse slotway 25 is a segmental draft bar 26 having therein a series of adjusting holes 27. Passing through one of the holes 27 and through the locking pin hole 24 in the bridge 23 is a locking pin 28. This may be retained to the draft bar or any other part of the implement by a suitable chain or other flexible connection, if so desired.

With the foregoing is used a draft chain 29 having at its rear end a bar link 30 formed through which are pin passage-ways 31 accommodating a retention pin 32. The pin 32 also passes through one of the adjusting holes 27. Pivotally connected to the bar link 30 is a link 33 to which is pivotally connected the front end of a draw bar 34. Pivotally connected to the rear end of the draw bar 34 is a link 35 by which the draw bar is pivotally connected to a two pocket shackle. This consists of a bridge 36 at each side of which is a link pocket 37. At the rear of each pocket 37 is an eye ring 38. Passing through the eye rings 38 and through the plow beam 9 is a pivot pin or bolt 39.

Secured to the plow beam 9 by means of a clamp 40 or the like is a suitable colter 41. This depends in close proximity to the plow share 6.

Mounted or otherwise secured to the plow beam 9 at or near the rear thereof is a bracket 42 carrying an upstanding pivot pin 43.

With the foregoing are used two steering handles 44. At the lower end of each handle 44, and preferably integral therewith, is a foot or lug 45 having therein a pivot pin hole 46. The pivot pin 43 passes through the said holes 46. Extending between the handles 44 at or near the lower ends thereof is a segmental adjusting bar 47. Also extending between the handles 44 may be suitable cross stays 48. The segmental bar 47 passes through the transverse slotway 16 before described. Above the said bar, beneath the bridge 14 and passing through the wedge passage-way 17 before described, is a wedge 49. This may be provided at each end with a hammer head 50 or the like.

Instead of the segmental downward extension 11 and pivoted front piece carrying the segmental draft bar 26, a forward piece may be used. This (Fig. 6ª) consists of two legs 51 each having a bolt hole 52 therein by which the said forward piece is bolted to the front end of the beam 9. Integral with one of the legs is a protuberance 53 having therein a stem hole 54 and provided with a jam screw 55. Depending from the front of the forward piece is a downward extension 56 having therein a plurality of transverse slotways 57. Formed in the front of the forward piece is a vertical pin passage 58. In the modification the clamp 5 is dispensed with the stem 4 of the wheel 2 passing through the hole 54 and being retained by the jam screw 55. The draft bar 26 passes through one of the slotways 57 and may be retained by a pin or the like passing through the passage 58 and one of the adjusting holes 27.

With this invention when the handles 44 are turned upon the pivot pin 43 to the left hand side of the beam 9 and have been locked in position by means of the wedge 49, and the segmental draft bar 26 has been adjusted to the left side of the beam 9 and locked in position by the locking pin 28, and the link 35 has been placed in the left link pocket 37, and the bar link 30 has been locked in position by the retention pin 32 upon the draft bar 26, the land may be plowed right up to the butt of almost any fruit or citrus tree. This operation with the parts adjusted as described is known as plowing on. When the handles 33 are turned to the right hand side of the plow beam 9 and the draft has been adjusted to the right hand side of the said beam the ground may also be plowed right up to the butts of the trees. This right hand operation constitutes what is known as plowing off. The furrows meet between the trees leaving nothing unplowed except perhaps a small V shaped piece against each tree butt. It will be readily seen that to move the draft to either side of the plow beam is a simple operation which only requires the slackening of the nut upon the pivot pin 39. The shackle may then be raised and the link 35 be passed across the bridge 36 and placed in the opposite pocket 37. The bar link 30 is removed from the draft bar 26 and the said draft bar passed through the transverse slotway 25. It is then locked in position by means of the pin 28. The bar link 30 may now be placed upon the draft bar at the opposite side of the plow and be locked to the said bar by the retention pin 32. Vertical adjustment of the draft is provided for by means of the segmental downward extension 11, it being only necessary to place the locking pin 22 in the adjusting hole 12 desired.

In the modification to vertically adjust the draft, the bar 26 is placed in the desired slotway 57 and locked therein by a pin or the like. The modification also permits of the supporting wheel 2 being disposed nearer the front of the plow beam and prevents any alteration in the longitudinal position of the wheel as regards the beam, when being adjusted.

Having now described my invention what I claim as new and desire to secure by Letters Patent is:—

1. In combination, a plow beam, a draft bar pivoted to the plow beam, an element pivoted to the plow beam and provided with a loop which straddles the top of said beam, a link engaging the loop on one side of the plow beam and adapted to be shifted from one side to the other of the beam and off the center of same, a connection between the link and the draft bar, handles on the beam, and means for shifting the handles from one side or the other of the center of said beam, according to the position of the loop.

2. In combination, a plow beam, an adjustable draft bar at the outer end of the beam, a yoke pivoted to the plow beam said yoke having longitudinal arms which lie substantially parallel with the beam and a loop which straddles the top of the beam, the yoke having depressions at the bottom of the loop, a link engaging in one of the depressions and adapted to be shifted from one side to the other of the beam and off the center of the latter, a flexible connection between the adjustable draft beam and the link, handles extending from the beam, and means for shifting the handles from one side to the other of the center of the beam, according to the position of the loop.

3. In combination, a beam, a pivoted draft bar on the beam, a loop straddling the top of the beam, a link engaging the loop on one side the center of the beam and adapted to be shifted from one side to the other of the loop, and a connection between the draft beam and the link.

In testimony whereof I have hereunto affixed my signature in the presence of two subscribing witnesses.

DANIEL HARVEY.

Witnesses:
CECIL M. SLESTINE,
ALAN McEACHEN.

Copies of this patent may be obtained for five cents each, by addressing the "Commissioner of Patents, Washington, D. C."